US012496752B2

(12) United States Patent
Rocker et al.

(10) Patent No.: US 12,496,752 B2
(45) Date of Patent: Dec. 16, 2025

(54) DEVICES AND METHOD FOR PRODUCING A T-SHAPED SEMIFINISHED PRODUCT FROM A MULTIPLY NON-CRIMP FABRIC

(71) Applicant: Airbus Operations GmbH, Hamburg (DE)

(72) Inventors: Olaf Rocker, Stade (DE); Torben Jacob, Beckdorf (DE); Carsten Barlag, Bliedersdorf (DE); Alexander Gillessen, Stade (DE); Thore Sdunnus, Braunschweig (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 18/676,927

(22) Filed: May 29, 2024

(65) Prior Publication Data

US 2024/0316837 A1   Sep. 26, 2024

Related U.S. Application Data

(60) Division of application No. 17/557,302, filed on Dec. 21, 2021, now Pat. No. 12,023,829, which is a
(Continued)

(30) Foreign Application Priority Data

Sep. 23, 2019   (DE) .................... 10 2019 125 494.9
Sep. 23, 2019   (DE) .................... 10 2019 125 498.1

(51) Int. Cl.
*B29C 70/34*   (2006.01)
*B29C 43/22*   (2006.01)
(Continued)

(52) U.S. Cl.
CPC ............ *B29C 43/46* (2013.01); *B29C 43/224* (2013.01); *B29C 43/3642* (2013.01);
(Continued)

(58) Field of Classification Search
CPC .......... B29C 43/102; B29C 2043/3657; B29C 43/3642; B29C 43/34; B29C 43/46
See application file for complete search history.

(56) References Cited

U.S. PATENT DOCUMENTS 2,401,299 A * 6/1946 Glavin ................... B27D 1/083
                                                                  425/389
2,975,476 A * 3/1961 Burke ....................... B41C 3/06
                                                                  264/315
(Continued)

FOREIGN PATENT DOCUMENTS

DE   102007032819 A1   1/2009
DE   102016125958 A1   7/2018
(Continued)

OTHER PUBLICATIONS

German Search Report for Application No. 102019125498 dated Apr. 27, 2020.
(Continued)

Primary Examiner — Matthew J Daniels
(74) Attorney, Agent, or Firm — KDW Firm PLLC

(57) ABSTRACT

Devices and methods for producing a T-shaped semifinished product from a multiply non-crimp fabric with reinforcing fibers for a composite material. The product has a web and a flange. The device includes a web forming tool, with which a web portion of the non-crimp fabric is clamped in place, a forming tool, with which plies of a flange portion of the non-crimp fabric are split into two parts, a depositing device, with which a tube body is deposited on the flange portion formed into the flange, a holding tool, with which a clearance between the holding tool and the flange is formed, and a filling device, with which the tube body is filled with a gas such that the tube body fills the clearance and firmly holds the flange portion formed into the flange, and alternatively,
(Continued)

a magnetic force can be generated between a sheet and the web forming tool.

13 Claims, 4 Drawing Sheets

Related U.S. Application Data continuation of application No. PCT/EP2020/075866, filed on Sep. 16, 2020.

(51) Int. Cl.
| | |
|---|---|
| *B29C 43/36* | (2006.01) |
| *B29C 43/46* | (2006.01) |
| *B29C 70/44* | (2006.01) |
| *B29C 70/50* | (2006.01) |
| *B29D 99/00* | (2010.01) |
| *B29C 43/32* | (2006.01) |
| *B29K 105/08* | (2006.01) |
| *B29L 31/00* | (2006.01) |

(52) U.S. Cl.
CPC .......... *B29C 70/446* (2013.01); *B29C 70/504* (2013.01); *B29D 99/0003* (2013.01); *B29C 2043/3211* (2013.01); *B29K 2105/0809* (2013.01); *B29L 2031/003* (2013.01)

(56) References Cited

U.S. PATENT DOCUMENTS

| | | | |
|---|---|---|---|
| 4,836,765 A | 6/1989 | Kornitzky | |
| 5,427,518 A * | 6/1995 | Morizot | B29C 70/38 100/211 |
| 5,538,589 A * | 7/1996 | Jensen | B29D 99/0003 156/583.8 |
| 5,665,301 A * | 9/1997 | Alanko | B29C 70/443 425/389 |
| 5,820,894 A * | 10/1998 | Kreutzer | B29C 70/549 425/389 |
| 11,524,468 B2 * | 12/2022 | Ward | B29C 70/32 |
| 2004/0183227 A1 * | 9/2004 | Velicki | B29C 66/721 264/258 |
| 2005/0023728 A1 * | 2/2005 | Benson | B29C 70/504 425/374 |
| 2007/0080481 A1 * | 4/2007 | Kismarton | B29C 70/446 425/389 |
| 2008/0277049 A1 * | 11/2008 | Roebroeks | B29C 66/81455 156/381 |
| 2009/0039566 A1 * | 2/2009 | Rodman | B29C 70/549 264/529 |
| 2009/0277568 A1 * | 11/2009 | Weimer | B29C 70/446 156/91 |
| 2009/0320995 A1 * | 12/2009 | Menendez Martin | B29C 43/3697 156/201 |
| 2010/0213644 A1 * | 8/2010 | Driver | B29C 70/44 425/522 |
| 2011/0205485 A1 * | 8/2011 | Sonzogni | B29C 53/04 156/196 |
| 2012/0056358 A1 | 3/2012 | Dixon | |
| 2013/0174396 A1 | 7/2013 | Torres Martinez | |
| 2013/0187314 A1 * | 7/2013 | Aravamudan | B29C 43/10 425/89 |
| 2013/0341816 A1 * | 12/2013 | Bergmann | B29C 51/085 264/314 |
| 2014/0290866 A1 | 10/2014 | Brufau Redondo | |
| 2014/0327178 A1 * | 11/2014 | Davis | B29C 33/02 264/258 |
| 2016/0332394 A1 * | 11/2016 | Chapman | B29C 70/384 |
| 2016/0354982 A1 * | 12/2016 | Prause | B29C 70/34 |
| 2018/0257314 A1 * | 9/2018 | Destories | B29C 33/505 |
| 2019/0329456 A1 * | 10/2019 | Sdunnus | B29B 11/12 |
| 2022/0379571 A1 * | 12/2022 | Kani | B29C 53/043 |

FOREIGN PATENT DOCUMENTS

| | | |
|---|---|---|
| EP | 1481790 A2 | 12/2004 |
| EP | 2327537 A1 | 6/2011 |
| EP | 2451622 B1 | 9/2017 |
| EP | 3482902 A1 | 5/2019 |
| WO | 0024563 A1 | 5/2000 |
| WO | 2014123645 A1 | 8/2014 |

OTHER PUBLICATIONS

International Search Report and Written Opinion for Application No. PCT/EP2020/075866 dated Nov. 20, 2020.

International Preliminary Report on Patentability for Application PCT/EP2020/075866 dated Mar. 15, 2022.

* cited by examiner

DEVICES AND METHOD FOR PRODUCING A T-SHAPED SEMIFINISHED PRODUCT FROM A MULTIPLY NON-CRIMP FABRIC

TECHNICAL FIELD

The disclosure herein relates to devices and methods for producing a T-shaped semifinished product from a multi-ply non-crimp fabric of reinforcing fibers for a composite material. Two groups of embodiments A and B are described.

BACKGROUND

In aircraft construction, use is made at many locations of fiber composite materials from which particularly light and therefore economical aircraft components can be produced. Fiber composite materials can be processed in various forms. For example, the processing often uses woven fabrics which are already impregnated with a resin and which are also referred to as prepregs. Alternatively, it is known to form multi-ply, flat non-crimp fabrics of reinforcing fibers into semifinished products before resin is added to them and they are cured. The term "non-crimp fabric" refers to the fact that non-crimp fabrics are formed from plies lying loosely on one another where the fibers, unlike in the case of woven fabrics, are not woven together.

So that the non-crimp fabrics do not slip in relation to one another, a binding agent is added to them which, once activated, connects the fibers of the different plies to one another. For example, binding agents which are activated by heat are known. It is known from the prior art to activate the binding agent directly before the non-crimp fabric is formed such that, after the forming, the plies of the non-crimp fabric are connected to one another, no longer slip in relation to one another and maintain their shape until the resin is introduced. However, this approach has the disadvantage that only little time remains for the forming operation and errors during the forming operation can be corrected only with difficulty, if at all, once the binding agent has cured.

Alternatively, it is known, for example, from DE 10 2016 125 958 A1 to form a non-crimp fabric from a plurality of stacked fiber plies into a T-shaped semifinished product before the binding agent is activated. The T-shaped semifinished product comprises a web and a flange extending perpendicular to the web, wherein a web portion of the non-crimp fabric that is intended to form the web is clamped in place in a web-shaping tool, and the remaining flange portion of the non-crimp fabric is divided into two parts with the aid of a forming tool having a plurality of rollers and formed into a web.

Since the binding agent is activated only after the forming operation and the non-crimp fabric is also impregnated with a resin and cured only after the forming operation, the plies of the non-crimp fabric can be easily deformed. So that the fiber plies retain their position after the forming operation until the binding agent is activated and cured, it is possible, after the forming of the fiber plies of the non-crimp fabric, for, for example, a film to be arranged on that part of the non-crimp fabric which forms the flange. The film or membrane is sucked onto the web-shaping tool by a negative pressure and thus holds the non-crimp fabric in position. By additional heat sources, for example infrared radiators or induction coils, the binding agent in the non-crimp fabric can then be activated such that the plies of the non-crimp fabric are already connected to one another before they are impregnated with resin and cured.

SUMMARY

Against this background, it is an object of the disclosure herein to specify an alternative device and an alternative method for producing a T-shaped semifinished product from a multi-ply non-crimp fabric.

The object is achieved by devices and methods disclosed herein. The reference signs each refer here to FIGS. 1A, 2A and 3A for the embodiments A and to FIGS. 1B, 2B and 3B for the embodiments B.

According to a first aspect, the object is achieved by a device A for producing a T-shaped semifinished product from a multi-ply non-crimp fabric of reinforcing fibers for a composite material, wherein a binding agent is added to the non-crimp fabric, and the T-shaped semifinished product has a web and a flange extending perpendicularly to the web. The device comprises a web-shaping tool which extends in a working direction and is configured to clamp in place a web portion of the multi-ply non-crimp fabric, the web portion shaping the web, a forming tool which is movable over the web-shaping tool in the working direction in order to divide plies of a flange portion of the multi-ply non-crimp fabric into two parts and to form them into the flange of the T-shaped semifinished product, and a depositing device which is likewise movable over the web-shaping tool in the working direction and is configured to deposit a flexible film on the flange portion formed into the flange, wherein the web-shaping tool and the flexible film are designed in such a manner that a magnetic force is generated between the film and the web-shaping tool, the magnetic force drawing the flexible film onto the web-shaping tool such that the flexible film secures the flange portion formed into the flange.

According to a first aspect, the object is achieved by a device B for producing a T-shaped semifinished product from a multi-ply non-crimp fabric of reinforcing fibers for a composite material, wherein a binding agent is added to the non-crimp fabric, and the T-shaped semifinished product has a web and a flange extending perpendicularly to the web. The device comprises a web-shaping tool which extends in a working direction and is configured to clamp in place a web portion of the multi-ply non-crimp fabric, the web portion shaping the web, a forming tool which is movable over the web-shaping tool in the working direction in order to divide plies of a flange portion of the multi-ply non-crimp fabric into two parts and to form them into the flange of the T-shaped semifinished product, a depositing device which is likewise movable over the web-shaping tool in the working direction in order to deposit a tubular body on the flange portion formed into the flange, a holding tool which comprises one or more holding elements, wherein the holding tool can be positioned in such a manner that the tubular body is arranged in a clearance between the holding element or the holding elements and the flange portion formed into the flange, and a filling device which is configured to fill the tubular body with a fluid in such a manner that the tubular body fills the clearance and secures the flange portion formed into the flange.

In other words, the disclosure herein relates to a device with which non-crimp fabrics of reinforcing fibers, for example glass fibers or carbon fibers, can be formed into a T-shaped semifinished product. The non-crimp fabric comprises a multiplicity of plies which lie loosely on one another or are stacked on one another and which can be displaced in relation to one another. The individual plies of the non-crimp fabric are therefore not connected to one another. In particular, they are neither woven nor stitched or adhesively bonded to one another. Arranged between the plies is a, for example, pulverulent binding agent which, as soon as it has been activated and cured, connects or adhesively bonds the plies to one another such that they can no longer be displaced in relation to one another. Once the binding agent has been cured, the plies can only still be deformed with difficulty since the plies of the non-crimp fabric are fixed relative to one another.

The non-crimp fabric is divided into at least two portions, a web portion and a flange portion. The region of the non-crimp fabric which is referred to as the web portion is intended to form the web of the T-shaped semifinished product while the flange of the T-shaped semifinished product is shaped with the device from the region of the non-crimp fabric that is referred to as the flange portion.

The device A itself comprises at least three elements: a web-shaping tool, a forming tool and a depositing device. The various elements may be independent, but may also be combined. In particular, the forming tool and the depositing device can be arranged and jointly moved on the same frame.

The device B itself comprises at least five elements: a web-shaping tool, a forming tool, a depositing device, a holding tool and a filling device. The various elements may be independent, but may also be combined.

The web-shaping tool is provided to clamp in place the web portion of the non-crimp fabric, i.e. to secure or to clamp the plies of the multi-ply non-crimp fabric in the region which is intended later to form the web of the T-shaped semifinished product. For this purpose, the web-shaping tool extends along a working direction which coincides with the direction in which the web of the T-shaped semifinished product is intended to extend. The working direction does not necessarily have to be a straight line, but may also have curvatures. The web-shaping tool preferably comprises two elongate jaws which extend parallel to the working direction and are configured in such a manner that the web portion can be clamped in place between the elongate jaws.

After the web portion of the non-crimp fabric has been clamped in place in the web-shaping tool, the flange portion of the multi-ply non-crimp fabric protruding out of the web-shaping tool is formed by the forming tool into the flange of the T-shaped semifinished product. The forming tool moving over the web-shaping tool in the working direction divides the plies of the non-crimp fabric first of all into two parts which are then folded over in an opposite direction relative to the web portion. The number of plies in the two parts can be identical or different.

For this purpose, the forming tool preferably has a plurality of forming rollers which are movable over the web-shaping tool parallel to the working direction in order to divide the flange portion of the non-crimp fabric, which initially extends in a plane, into two parts and to form same into the flange. The forming rollers initially push apart the plies of the flange portion and then continuously fold them over ever further until the flange portion extends in a plane which runs perpendicularly to the plane in which the web portion held by the web-shaping tool runs. In this case, for example, surfaces of the web-shaping tool facing the forming tool, in particular surfaces of the elongate jaws of the web-shaping tool, can serve as contact surfaces against which the flange portion is formed.

Subsequently, in the case of the embodiments A, a flexible film or membrane is deposited with the depositing device on the flange portion formed into the flange, wherein the film is preferably formed from a magnetic or magnetizable material. In a preferred embodiment, the depositing device comprises a pressing roller which is movable over the web-shaping tool in the working direction in such a manner that the flexible film in the working direction behind the forming tool is guided via the pressing roller onto the flange portion formed into the flange and pressed onto the flange portion. It is thereby ensured in an advantageous manner that the film lies flat on the formed flange portion even if the flange of the T-shaped semifinished product is to be curved or follows other complex geometries.

Finally, in the case of the embodiments A, the web-shaping tool and the flexible film are designed in such a manner that a magnetic force is generated or can be generated between film and web-shaping tool, the magnetic force drawing the film toward the web-shaping tool or toward contact surfaces, which are formed by the web-shaping tool, for the flange portion. For this purpose, the web-shaping tool preferably has one or more permanent magnets and/or one or more solenoids which interact with a magnetic or magnetizable film.

In the case of the embodiments A, the formed flange portion is clamped in place between film and web-shaping tool and held securely in the formed position by the magnetic force acting on the film. Since the film is flexible, it can also be deposited on curved contact surfaces or contact surfaces which are not flat in some other way and can directly reproduce the shape of the flange. It is ensured in an advantageous manner that the formed flange portion is held permanently in its formed shape until the binding agent has been activated and the plies of the multi-ply non-crimp fabric have been connected to one another such that they can no longer be displaced in relation to one another. In contrast to devices in which the film is sucked up onto the web-shaping tool by a negative pressure, the use of magnetic force has the advantage that the film can be drawn extensively over the entire region without an air-permeable non-crimp fabric having to be used for this purpose.

In a preferred embodiment in the case of the embodiments A, the device furthermore comprises a heating device which is configured to heat the flange portion formed into the flange such that the binding agent which has been added to the non-crimp fabric is activated. In other words, the heating device is used to heat the formed flange portion and to activate the binding agent with which the non-crimp fabric has been provided. The heating device can be integrated, for example, in the web-shaping tool and formed by heating coils. However, it is also conceivable to use infrared radiators which, for example, heat the film or the flange portion through the film.

In a second aspect, in the case of the embodiments A, the object is achieved by a method for producing a T-shaped semifinished product from a multi-ply non-crimp fabric of reinforcing fibers for a composite material. A binding agent has been added to the non-crimp fabric. The T-shaped semifinished product has a web and a flange extending perpendicularly to the web. The method comprises the steps of clamping in place a web portion of the multi-ply non-crimp fabric, the web portion shaping the web, in a working direction in a web tool, dividing plies of a flange portion of the multi-ply non-crimp fabric into two parts and forming the plies of the flange portion into the flange of the T-shaped semifinished product with a forming tool which is moved over the web-shaping tool in the working direction, depositing a flexible film in the working direction on the flange portion formed into the flange, and generating a magnetic force between the film and the web-shaping tool, the magnetic force drawing the flexible film onto the web-shaping tool such that the flexible film secures the flange portion formed into the flange.

Preferably, in the case of the embodiments A, the flange portion formed into the flange is heated and the binding agent which has been added to the non-crimp fabric is activated while the magnetic force is generated.

Subsequently, in the case of the embodiments B, a tubular body with a preferably flat cross section is arranged by the depositing device on the flange portion formed into the flange and preferably pressed fixedly onto the flange portion. The width of the tubular body parallel to the plane in which the flange portion extends after the forming operation should preferably correspond here at least to the width of the flange portion. The depositing device moves here over the web-shaping tool, for example directly behind the forming tool, and can be connected in particular directly to the web-shaping tool by the depositing device being fastened, for example, to the same frame. The tubular body is formed, for example, from a flexible material which may also be stretchable, but does not have to be stretchable.

In a preferred embodiment, the depositing device of the embodiments B comprises a pressing roller which is movable over the web-shaping tool in the working direction in such a manner that the tubular body is guided on the flange portion formed into the flange via the pressing roller behind the forming tool in the working direction and pressed onto the flange portion. It is thus ensured that the tubular body rests flat on the formed tubular portion and follows the contour of the flange. In addition, pressing on with the pressing roller prevents the tube or the tubular body from being filled with gas in portions which have not yet been arranged on the flange portion, which would make it difficult to deposit the tube.

Above the tubular body of the embodiments B, the holding tool is arranged in such a manner that between the formed flange portion and the holding element or the holding elements of the holding tool a clearance or cavity remains in which the tubular body is arranged and which the tubular body fills as soon as it is filled with the fluid. The holding tool preferably comprises a plurality of holding elements in the form of holding rollers which are movable over the web-shaping tool in the working direction. The holding rollers can be moved here at a consistent height, and therefore the distance between the holding rollers and the formed flange portion is changed if the flange portion is intended to be curved in the working direction.

Finally, the device of the embodiments B comprises a filling device, for example a compressor or a pump, with which the tubular body can be filled with a fluid which is, for example, a gas, such as preferably air, or a liquid, such as, for example, an oil. The tubular body is pressurized here with a pressure which is greater than the ambient or atmospheric pressure. The tubular body is filled to such an extent that it at least fills the cavity between holding tool and formed flange portion. Since the holding tool limits the expansion of the tubular body away from the flange portion, the pressure in the tubular body causes a force to be exerted on the flange portion, the force holding the formed plies in position until the binding agent has been activated and cured. Since the tubular body is flexible, it advantageously follows the contours of the flange portion such that even T-shaped semifinished products having complex profiles can be manufactured without more complicated tools being required for this purpose for holding the flange portion until the binder has cured.

The filling device of the embodiments B is preferably designed to fill the tubular body with a heated fluid such that the tubular body heats the flange portion formed into the flange and the binding agent which has been added to the non-crimp fabric is activated under the additionally acting pressure of the tubular body filled by atmospheric pressure. Therefore, advantageously, no heating elements are required for activating the binding agent. In particular, the heating elements neither have to be integrated in the contact surfaces onto which the flange portion is formed, which is intended to significantly reduce the costs for producing the corresponding tool, nor does the tubular body have to be configured in such a manner that the heat can be introduced through the tubular body into the flange portion.

Alternatively or additionally, the tubular body of the embodiments B can be designed in such a manner that a facing surface of the tubular body after the tubular body is deposited on the formed flange portion can be heated. For this purpose, for example, heating wires can be embedded in the wall of the tubular body such that the tubular body can be heated electrically.

In a second aspect of the embodiments B, the object is achieved by a method for producing a T-shaped semifinished product from a multi-ply non-crimp fabric of reinforcing fibers for a composite material. A binding agent has been added to the non-crimp fabric. The T-shaped semifinished product has a web and a flange extending perpendicularly to the web. The method comprises the steps of clamping in place a web portion of the multi-ply non-crimp fabric, the web portion shaping the web, in a working direction, dividing plies of a flange portion of the multi-ply non-crimp fabric into two parts and forming the plies of the flange portion into the flange of the T-shaped semifinished product with a forming tool which is moved in the working direction, depositing the tubular body in the working direction on the flange portion formed into the flange, positioning a holding tool in such a manner that the tubular body is arranged in a clearance between the holding tool and the flange portion formed into the flange, and filling the tubular body with a gas such that the tubular body fills the clearance and secures the flange portion formed into the flange. For example, one of the above-described devices can be used for carrying out the method or one of the embodiments of the method that are described in more detail below.

The tubular body of the embodiments B is preferably filled with a heated gas such that the tubular body heats the flange portion formed into the flange and activates the binding agent which has been added to the non-crimp fabric.

In the case of the embodiments A and B, it is furthermore preferred if the web portion is clamped in place between two elongate jaws of a web-shaping tool, the jaws extending in the working direction.

In the case of the embodiments A and B, the flange portion is divided into two parts preferably by a forming tool, which has a plurality of forming rollers which are movable parallel to the working direction, and is formed into the flange.

In the case of the embodiments A, in a preferred embodiment, the flexible film in the working direction behind the forming tool is guided via a pressing roller onto the flange portion formed into the flange and is pressed onto the flange portion with the pressing roller.

In a preferred embodiment of the embodiments B, the tubular body in the working direction behind the forming tool is guided via a pressing roller onto the flange portion formed into the flange and is pressed onto the flange portion with the pressing roller.

Finally, in the case of the embodiments B, it is preferred that the holding tool comprises a plurality of holding elements in the form of holding rollers which are moved in the working direction over the flange portion formed into the flange.

The advantages of the various embodiments of the method of the embodiments A and B correspond to the advantages of the various embodiments of the device for producing a T-shaped semifinished product.

BRIEF DESCRIPTION OF THE DRAWINGS

The disclosure herein will be described in more detail below with reference to the drawings, in which, in the case of the embodiments A and B.

DETAILED DESCRIPTION

Figure 1:
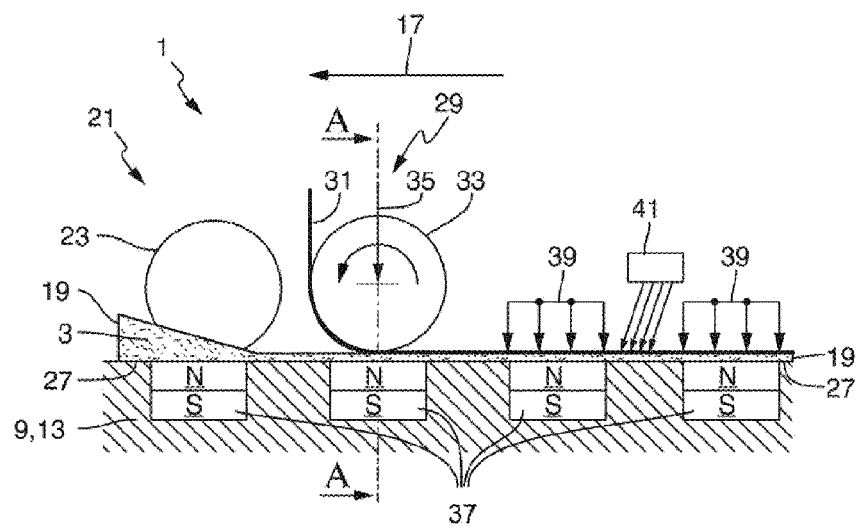
FIGS. 1A, 1B show lateral views of an example embodiment of a device for producing a T-shaped semifinished product.
Figure 1:
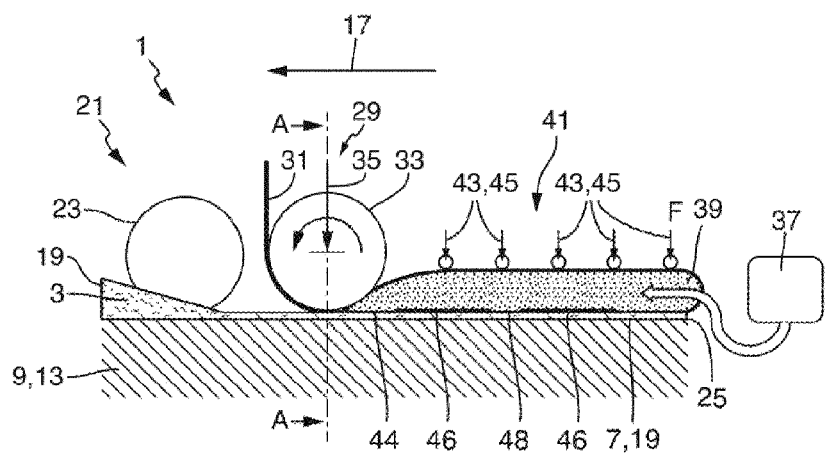
Figure 2:
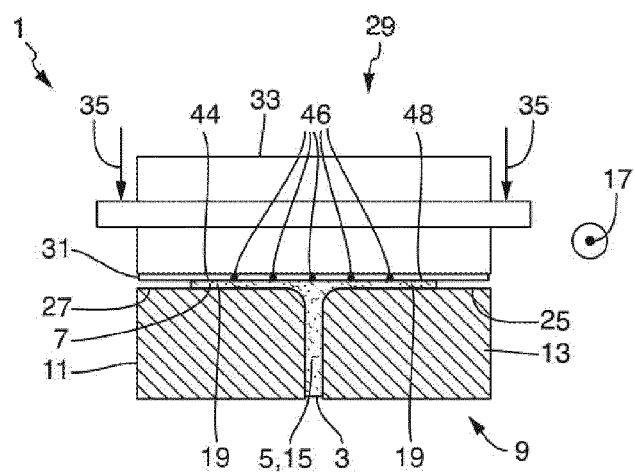
FIGS. 2A, 2B show a section along the line A-A through the device from FIGS. 1A, 1B.
Figure 2:
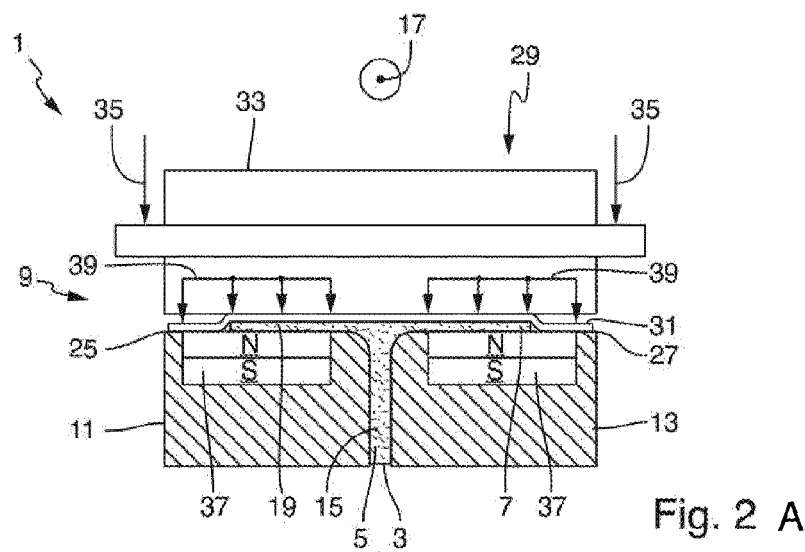

In the following, with respect to FIGS. 1A and 2A and also FIGS. 1A and 2B, first of all an example embodiment of a device 1 for producing a T-shaped semifinished product for a fiber composite material from a multi-ply non-crimp fabric 3 will be described. The individual plies of the non-crimp fabric are not illustrated in the figures. The T-shaped semifinished product, the cross-sectional shape of which can be clearly seen in particular in the sectional view of FIGS. 2A, 2B, comprises a web 5 and a flange 7 extending perpendicularly to the web 5. A binding agent has been added to the non-crimp fabric 3, the binding agent being able to be activated by heat and, after curing, adhesively bonds the plies of the non-crimp fabric 3 to one another.

The device 1 of the embodiments A and B first of all comprises a web-shaping tool 9 with two jaws 11, 13 between which a web portion 15 of the non-crimp fabric 3 is clamped in place. As can be seen in FIGS. 1A, 1B, the jaws 11, 13 extend in a working direction 17 which runs perpendicularly into the plane of the drawing in FIGS. 2A, 2B.

In the case of the embodiments A and B, the flange portion 19 of the non-crimp fabric 3 that protrudes upward out of the web-shaping tool 9 is divided into two parts by a forming tool 21 moved over the web-shaping tool 9 in the working direction 17 and formed into the flange 7 of the T-shaped semifinished product. The forming tool 21 comprises a multiplicity of forming rollers 23, of which, however, only one is illustrated in FIG. 1A in order to keep the drawing clear. With the forming rollers 23, the flange portion 19 of the non-crimp fabric 3 that extends beforehand substantially in one plane with the web portion 15 is first of all divided up into two parts having in each case one or more plies and then folded over onto contact surfaces 25, 27 which are formed by surfaces 25, 27 of the jaws 11, 13 of the web-shaping tool 9 that face the forming tool 21.

Subsequently a flexible, magnetizable film 31 is deposited or applied with a depositing device 29 onto the flange portion 19 formed into the flange 7 in the case of the embodiments A. The depositing device 29 is fastened together with the forming tool 21 to a common frame, which is not illustrated in the figures, and is moved together with the forming tool 21 over the web-shaping tool 9 in the working direction 17. In order to deposit the film 31, the depositing device 29 comprises a pressing roller 33 with which the film 31 is pressed firmly onto the formed flange portion 19 of the non-crimp fabric 3. The depositing device 29 exerts a force 35 on the film 31 and on the non-crimp fabric 3 lying below the latter, the force acting perpendicularly to the contact surfaces 25, 27. It is therefore ensured that the film 31 rests extensively on the formed non-crimp fabric 3 and follows the contours of the flange 7, even if the latter is intended to have curvatures or other complex geometries.

A magnetic force is exerted via permanent magnets 37, which are arranged in the web-shaping tool 9 or specifically in the jaws 11, 13, on the film 31 deposited, in the case of the embodiments A, on the formed flange portion 19, by which magnetic force the magnetizable film 31 is acted upon with a force 39 toward the contact surfaces 25, 27. By this, the flange portion 19, formed into the flange 7, of the non-crimp fabric 3 is fixed between the contact surfaces 25, 27 and the film 31 and retains its shape. Since the film 31 is flexible and the magnetic force acts uniformly on the film 31 irrespective of the shape of the contact surfaces, the flange portion 19 can advantageously be fixed with the film 31 even if the flange 7 is curved or follows other complex geometries.

Finally, the device 1, in the case of the embodiments A, also comprises a heating device 41 in the form of an infrared radiator with which the flange portion 19 can be heated through the film 31 or indirectly by heating of the film 31 such that the binding agent is activated under the pressure and heat generated by the magnetic force acting on the film 31 and the plies of the non-crimp fabric 3 are adhesively bonded to one another. By fixing the formed flange portion 19 with the magnetic force acting on the film 31, the plies of the non-crimp fabric 3 can be held until the binding agent has cured.

In the case of the embodiments B, a tubular body 31 is subsequently deposited or applied with a depositing device 29 onto the flange portion 19 formed into the flange 7, the depositing device being moved together with the forming tool 21 over the web-shaping tool 9 in the working direction 17. In order to deposit the tubular body 31, the depositing device 29 comprises a pressing roller 33 with which the tubular body 31 is pressed firmly onto the formed flange portion 19 of the non-crimp fabric 3. In the process, the depositing device 29 exerts a force 35 on the tubular body 31 and on the non-crimp fabric 3 lying therebelow, the force acting perpendicularly to the contact surfaces 25, 27. It is therefore ensured that the tubular body 31 rests extensively on the formed non-crimp fabric 3 and follows the contours of the flange 7, even if the latter is intended to have curvatures or other complex geometries.

In the case of the embodiments B, the tubular body 31 deposited on the formed flange portion 19 is then filled by a filling device 37 with a heated fluid, specifically preferably gas in the form of warm air, wherein the pressure of the gas in the tubular body 31 is higher than the atmospheric pressure. As a result, the tubular body 31 previously lying flat is pumped up and fills a cavity 39 between the flange portion 19 and a holding tool 41 arranged above the latter. The holding tool 41, which comprises a multiplicity of holding elements 43 in the form of holding rollers 45 and is likewise moved over the web-shaping tool 9 in the working direction 17, prevents the tubular body 31 from being able to expand too far away from the contact surfaces 25, 27. Therefore, by the pressure in the tubular body 31, the uniform force is exerted on the formed flange portion 19, the force holding the flange portion 19 in position while the warm air in the tubular body 31 heats the flange portion 19 and activates the binding agent. Owing to the flexible shape of the tubular body 31, the latter in an advantageous manner exerts a uniform pressure overall on the formed flange portion 19 of the non-crimp fabric 3, even in the case of complex geometries of the web, such that the flange portion can be securely fixed until the binding agent or the binder has cured and the plies of the non-crimp fabric 3 have adhesively bonded to one another.

In addition, in the case of the embodiments B, the wall 44 of the tubular body 31 has a plurality of heating wires 46 with which a facing surface 48 of the tubular body 31, after the tubular body 31 is deposited on the flange portion 19, and therefore also the flange portion 19, lying therebelow, of the non-crimp fabric 3 can be additionally heated in order to accelerate the activation and the curing of the binding agent.

Figure 3:
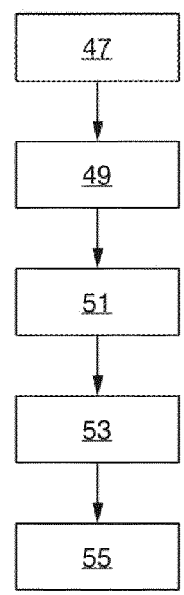
FIGS. 3A, 3B show flow diagrams showing steps of an example embodiment of a method for producing a T-shaped semifinished product.
Figure 3:
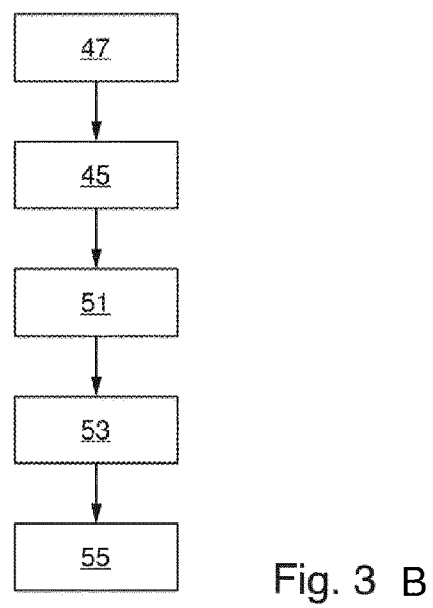

Finally, in the case of the embodiments A and B, with reference to FIGS. 3A, 3B, a method for producing a T-shaped semifinished product from a non-crimp fabric 3 is described, wherein the device 1 shown in previous figures is used for carrying out the method.

In the case of the embodiments A, in a first step 47, first of all the web portion 15 of the non-crimp fabric 3 is clamped in place between the jaws 11, 13 of the web-shaping tool 9 in the working direction 17. In the second step 49, the plies of the non-crimp fabric 3 of the flange portion 19 protruding upward out of the jaws 11, 13 are divided into two parts by the forming rollers 23 of the forming tool 21 and formed onto the contact surfaces 25, 27. In the third step 51, the magnetizable film 31 is deposited by the depositing tool 29 onto the formed flange portion 19 and firmly pressed against the flange portion 19 by the pressing roller 33. After the depositing, either directly by permanent magnets 37 or after activation of solenoids which can be used instead of or in addition to the permanent magnets 37 in the device 1, in a fourth step 53 a magnetic force is generated between the magnetizable film 31 and the web-shaping tool 9, by which magnetic force the film 31 is drawn onto the contact surfaces 25, 27 in such a manner that a pressure is exerted on the formed flange portion 19 and the flange portion is fixed until the binding agent is activated and cured. Finally, in a fifth step 55, the formed flange portion 19 is heated by the heating device 41. As a result, the binding agent is activated and the plies of the flange portion 19 adhesively bonded to one another.

In the case of the embodiments B, in a first step 47, first of all the web portion 15 of the non-crimp fabric 3 is clamped in place between the jaws 11, 13 of the web-shaping tool 9 in the working direction 17. In the second step 49, the plies of the non-crimp fabric 3 of the flange portion 19 protruding upward out of the jaws 11, 13 are divided into two parts by the forming rollers 23 of the forming tool 21 and formed onto the contact surfaces 25, 27. In the third step 51, the tubular body 31 is deposited by the depositing tool 29 on the formed flange portion 19 and firmly pressed against the flange portion 19 by the pressing roller 33. Subsequently, in the fourth step 53, the holding tool 41 is positioned in such a manner that a clearance 39, in which the tubular body 31 runs, is formed between the holding elements 43 and the flange portion 19. Finally, in a fifth step 55, the tubular body 31 is filled with warm air by the filling device 37 at a pressure which is greater than the ambient pressure such that the tubular body fills the clearance 39 and presses and fixes the flange portion 19 extensively against the contact surfaces 25, 27. Since the tubular body 31 is heated by the warm air, the non-crimp fabric 3 is also heated in the region of the formed flange portion 19. As a result, the binding agent is activated and the plies of the flange portion 19 are adhesively bonded to one another.

In the case of the embodiments A and B, the steps of the method can be carried out in parallel.

While at least one example embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A device for producing a T-shaped semifinished product from a multi-ply non-crimp fabric of reinforcing fibers for a composite material, wherein a binding agent is added to the non-crimp fabric, and the T-shaped semifinished product has a web and a flange extending perpendicularly to the web, the device comprising:
    a web-shaping tool which extends in a working direction and is configured to clamp in place a web portion of the multi-ply non-crimp fabric, the web portion shaping the web;
    a forming tool which is movable over the web-shaping tool in the working direction to divide plies of a flange portion of the multi-ply non-crimp fabric into two parts and to form them into the flange of the T-shaped semifinished product;
    a tubular body;
    a depositing device which is movable over the web-shaping tool in the working direction to deposit the tubular body on the flange portion formed into the flange;
    a holding tool which comprises one or more holding elements, wherein the holding tool can be positioned such that the tubular body is arranged in a clearance between the holding element or the holding elements and the flange portion formed into the flange; and
    a filling device which is configured to fill the tubular body with a fluid such that the tubular body fills the clearance and secures the flange portion formed into the flange.

2. The device of claim 1, wherein the filling device is configured to fill the tubular body with a heated fluid such that:
    the tubular body heats the flange portion formed into the flange; and
    the binding agent of the non-crimp fabric is activated.

3. The device of claim 1, wherein the web-shaping tool comprises two elongate jaws which extend parallel to the working direction and are configured such that the web portion can be clamped in place between the two elongate jaws.

4. The device of claim 1, wherein the forming tool has a plurality of forming rollers which are movable over the web-shaping tool, in a direction parallel to the working direction, to divide the flange portion of the non-crimp fabric, which initially extends in a plane, into two parts and to form the flange portion into the flange.

5. The device of claim 1, wherein the depositing device comprises a pressing roller which is movable over the web-shaping tool in the working direction such that the tubular body in the working direction behind the forming tool is guided via the pressing roller onto the flange portion formed into the flange and pressed onto the flange portion.

6. The device of claim 1, wherein the holding tool comprises a plurality of holding elements in a form of holding rollers which are movable in the working direction over the web-shaping tool.

7. The device of claim 1, wherein the tubular body is configured such that a facing surface of the tubular body can be electrically heated after the tubular body is deposited on the formed flange portion.

8. A method for producing a T-shaped semifinished product from a multi-ply non-crimp fabric of reinforcing fibers for a composite material, wherein a binding agent is added to the non-crimp fabric, and the T-shaped semifinished product has a web and a flange extending perpendicular to the web, the method comprising:
   clamping in place a web portion of the multi-ply non-crimp fabric, the web portion shaping the web, in a working direction;
   dividing plies of a flange portion of the multi-ply non-crimp fabric into two parts and forming the plies of the flange portion into the flange of the T-shaped semifinished product with a forming tool which is moved in the working direction;
   depositing a tubular body in the working direction on the flange portion formed into the flange;
   positioning a holding tool such that the tubular body is in a clearance between the holding tool and the flange portion formed into the flange; and
   filling the tubular body with a fluid such that the tubular body fills the clearance and secures the flange portion formed into the flange.

9. The method of claim 8, wherein the fluid, with which the tubular body is filled, is a heated fluid, such that the tubular body heats the flange portion formed into the flange and activates the binding agent of the non-crimp fabric.

10. The method of claim 8, comprising clamping the web portion in place between two elongate jaws of a web-shaping tool, the two elongate jaws extending in the working direction.

11. The method of claim 8, wherein:
   the forming tool has a plurality of forming rollers, which are moved parallel to the working direction; and
   the flange portion is divided into two parts by the forming tool and is formed into the flange.

12. The method of claim 8, comprising using a pressing roller for:
   guiding the tubular body in the working direction behind the forming tool and is guided via a pressing roller onto the flange portion formed into the flange; and
   pressing the tubular body onto the flange portion.

13. The method of claim 8, wherein the holding tool comprises a plurality of holding elements in a form of holding rollers which are moved in the working direction over the flange portion formed into the flange.

* * * * *